United States Patent [19]

Kloppenburg et al.

[11] Patent Number: 5,049,737

[45] Date of Patent: Sep. 17, 1991

[54] SCANNER FOR CLOCK DISCS FOR PUTTING OUT SIGNALS TO AN EVALUATION CIRCUIT IN TYPEWRITERS OR OFFICE MACHINES OF SIMILAR CONSTRUCTION

[75] Inventors: Ernst Kloppenburg, Strackholt; Heiner Gerken, Jever; Wilfred Penning, Varel, all of Fed. Rep. of Germany

[73] Assignee: AEG Olympia Office GmbH, Wilhelmshaven, Fed. Rep. of Germany

[21] Appl. No.: 467,209

[22] Filed: Jan. 19, 1990

[30] Foreign Application Priority Data

Jan. 20, 1989 [DE] Fed. Rep. of Germany ....... 3901535

[51] Int. Cl.[5] ............................................... G01D 5/34

[52] U.S. Cl. ........................... 250/231.16; 250/237 G

[58] Field of Search ...................... 250/231.14, 231.15, 250/231.16, 231.17, 231.18, 237 R, 208 Z, 237 G, 216

[56] References Cited

U.S. PATENT DOCUMENTS

| | | | |
|---|---|---|---|
| 3,894,232 | 7/1975 | Laspesa | 250/231.14 |
| 3,902,063 | 8/1975 | Oelsch et al. | 250/231.16 |
| 4,270,868 | 6/1981 | Morgan et al. | 400/320 |
| 4,338,517 | 7/1982 | Perrine | 250/231.14 |
| 4,518,859 | 5/1985 | Hoshika | 250/231.14 |

*Primary Examiner*—David C. Nelms
*Attorney, Agent, or Firm*—Spencer & Frank

[57] ABSTRACT

The invention relates to a scanner for clock discs driven by d.c. motors and provided with light transmitting slits for putting out signals to an evaluation circuit in typewriters or office machines of similar construction, with the slits (4) being scannable by a dual light barrier arrangement (5) in the form of a position sensor and including a light source (6) and two light receivers (7, 8). In order to ensure accurate control of the d.c. motor (1) and of the driven members connected therewith, e.g. a print wheel or a printer carriage, it is necessary that the signals at the two output channels, which are offset by one-quarter of a clock pulse period, do not go above or below a certain maximum value. Electrical control devices for such a necessary adjustment process are already known but they are less suitable for inexpensive office machines. The adjustment of the two sinusoidally configured signals at the output channels of the light receivers (7, 8) is realized according to the invention in that the cross section of the bundle of light beams coming from the light source (6) can be varied in the simplest manner by means of adjustable shutters (21, 22) which can be manually pivoted into their beam path. This permits rapid adjustment of the maximum values of the output voltages in the light receivers (7, 8) to a predetermined voltage.

5 Claims, 2 Drawing Sheets

SCANNER FOR CLOCK DISCS FOR PUTTING OUT SIGNALS TO AN EVALUATION CIRCUIT IN TYPEWRITERS OR OFFICE MACHINES OF SIMILAR CONSTRUCTION

BACKGROUND OF THE INVENTION

The invention relates to a scanner for a clock disc including light transmitting slits which are uniformly distributed over the circumference of the clock disc for transmitting signals to an evaluation circuit, particularly to control the position of a driven member operated by a d.c. motor, e.g. a rotatably mounted printed wheel in a typewriter or office machine of similar construction, wherein the clock disc is fixed to a drive shaft of the motor and the slits can be scanned by means of a light barrier arrangement in the form of a position sensor including a light source for projecting a bundle of light beams along respective beam paths and a light receiver disposed for receiving the light beams after having passed through the slits and producing output voltages representing the received light beams.

Scanners are employed, for example, for incremental and/or absolute digital length or angle measuring systems in which photo elements convert a light current modulated by the gradations of a scale and a scanning plate into electrical signals which serve to determine and digitally display path informations.

It is known, for example, to determine the position of the printing mechanism relative to the platen and the record carrier by optically scanning the slits in a scanning disc fastened to the motor shaft of the driving d.c. motor. For an unequivocal position determination, two incremental scanners are normally required which, upon rotation of the shaft, emit two pulse signals which are electrically shifted in phase by 90°. To determine the position of the printing mechanism, the pulses supplied by the optical scanners are summed, namely with a positive sign in the one direction of movement of the printing mechanism and with a negative sign in the other. The positive or the negative sign are here derived from the phase position of the two pulse signals. The scanners employed in this arrangement are adjusted electrically which is relatively complicated.

Moreover, U.S. Pat. No. 4,270,868 discloses a digital control device for a d.c. motor in printers in which a scanning disc fastened on the shaft of the d.c. motor generates, in conjunction with a detector, produces a series of pulses whose succession in time is inversely proportional to the number of revolutions of the d.c. motor. The time between discrete positions of the motor shaft is compared with a desired time and the difference is stored in a register. This difference is converted to a pulse width modulated signal which directly controls the number of revolutions of the motor.

SUMMARY OF THE INVENTION

It is the objeot of the invention to provide a soanner for clock discs having light-transmitting slits uniformly distributed over their circumference for the emission of signals to an evaluation circuit which permits, with the simplest means, easy adjustment of the maximum output voltage values to a predetermined voltage in light receivers of a light barrier arrangement which scans the slits.

The above and other objects are accomplished in the context of a scanner of the type first described above, wherein in accordance with the invention, the light source is a sole light source and has an exit surface with a circular cross section, and the scanner further includes two adjustable shutters, each having an identical semicircular covering surface and arranged diametrically with respect to the circular cross section of the exit surface of the light source, the shutters being mounted for being manually pivoted into the beam paths for changing the cross section of the bundle of light beams coming from the light source so that the maximum values of the output voltages of the light receivers are adjusted to predetermined voltages, wherein the covering faces of the shutters each have circumferential faces which, when the shutters are in a position of maximum coverage of the light beams, just do not touch one another in the center of the exit surface where the light beams exit from the light source.

The signals present at the output channels can be adjusted in the simplest manner to a predetermined value. For this purpose, shutters are pivotally arranged. By means of a simple tool, e.g. a screw driver, these shutters can be pivoted to a greater or lesser degree into the cross section of the bundle of light beams coming from the light source so that the maximum value of the level voltage can be quickly and comfortably set to a predetermined voltage value.

The invention will now be described in greater detail with reference to an embodiment illustrated in the accompanying drawing. It is shown in:

DETAILED DESCRIPTION OF THE PREFERRED EMBODIMENT

Figure 1:
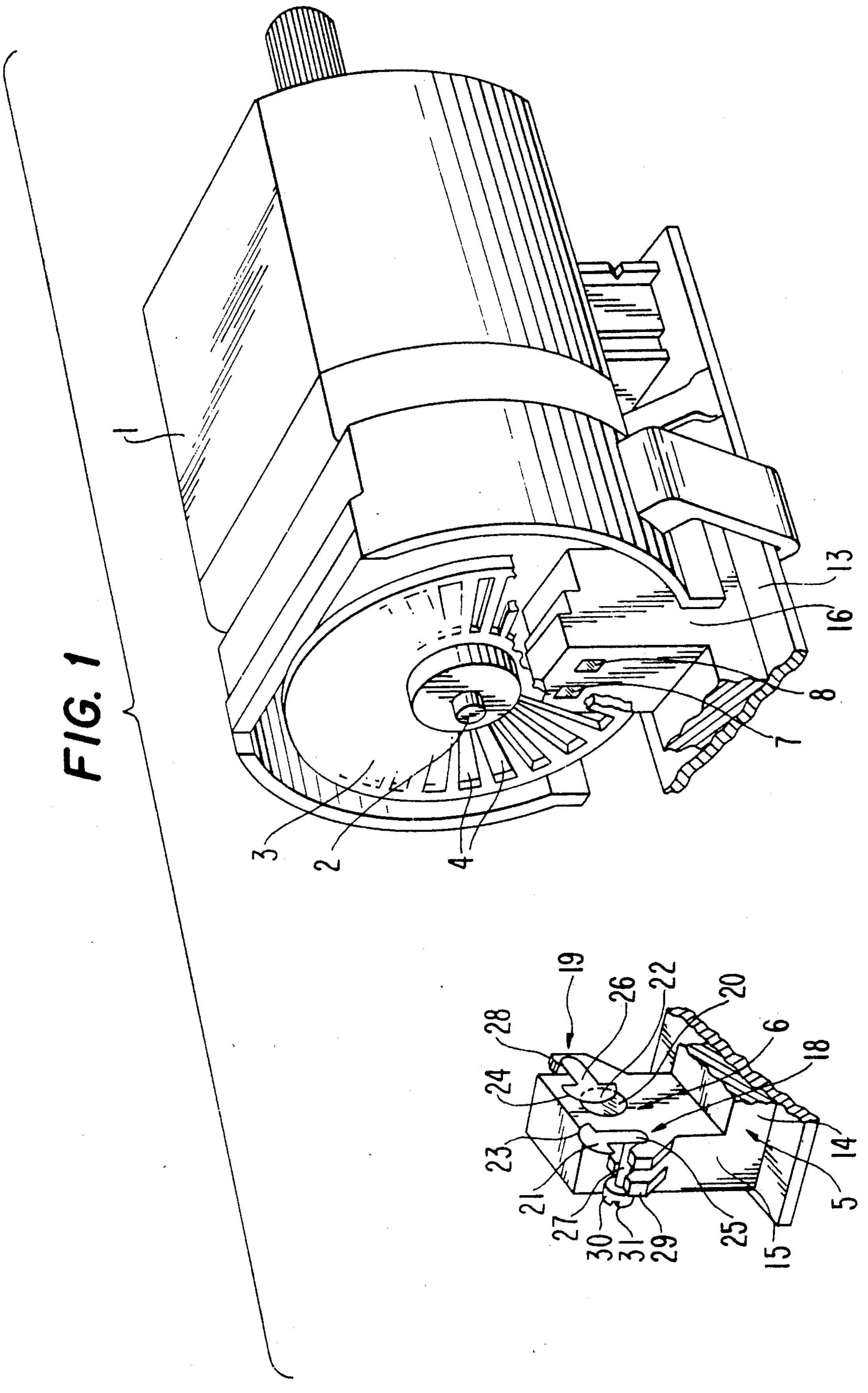
FIG. 1 is a perspective view, partially broken away, of a drive motor including the scanner in accordance with the invention.
Figure 2:
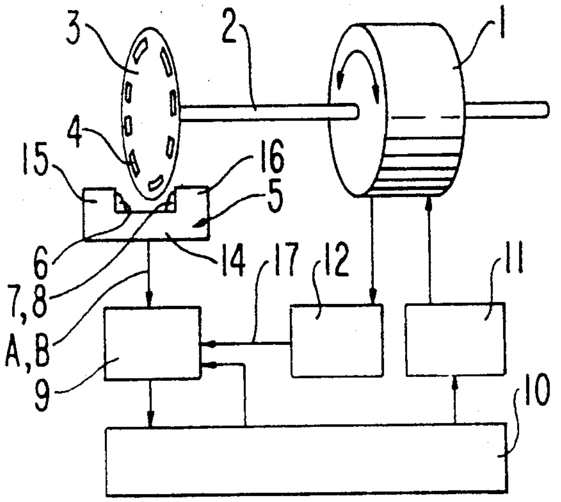
FIG. 2 a block circuit diagram for the control circuit according to the principle of the invention.

FIG. 1 shows a d.c. motor 1 on whose drive shaft 2 there is fastened a clock disc 3 which is provided with light-transmitting slits 4 that are uniformly distributed over its circumference. These slits 4 are scanned by a light barrier arrangement 5 in the form of a position sensor and including a light source 6 and two light receivers 7, 8. If clock disc 3 performs a rotational movement, the light barrier arrangement furnishes pulses to a counter 9 (FIG. 3) for counting in the positive or negative direction. This counter 9 interacts in a known manner with a control circuit 10 which receives these signals for evaluation, particularly for controlling the position of the driven member (not shown) which is driven by d.c. motor 1 and is, e.g., a rotatably mounted print wheel or a longitudinally displaceable carriage. Moreover, d.c. motor 1 is actuated by control circuit 10 via a bridge circuit 11. If control circuit 10 causes d.c. motor 1 to rotate from a standstill due to the current supplied by bridge circuit 11, control circuit 10 determines the direction of rotation. If d.c. motor 1 is braked by a generator until it is at a standstill, i.e. if control circuit 10 no longer supplies current to d.c. motor 1, a rotation direction discriminator 12 determines the positive or negative direction of rotation. A signal 17 emitted by rotation direction discriminator 12 is evaluated in counter 9 as a control criterion for the counting of the pulses received from light barrier arrangement 5 in the positive or negative direction so that the number present in counter 9 unequivocally stands for the position of the print wheel moved by d.c. motor 1 or the carriage moved by the d.c. motor.

The dual light barrier arrangement 5 serving as position sensor and encoder is disposed in a U-shaped bearing block 14, with light source 6 being located in one arm 15 and the two light receivers 7, 8 in the other arm 16 of bearing block 14. Bearing block 14 is fixed to a bottom control plate 13 on which is also disposed the control circuit 10 for d.c. motor 1. Clock disc 3 is rotatably disposed in recess between arms 15 and 16.

Figure 4:
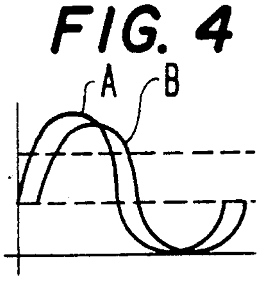
FIG. 4 illustrates the encoder signals before adjustment.
Figure 5:
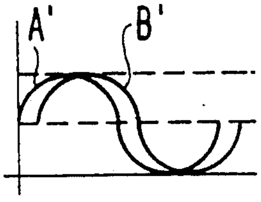
FIG. 5 illustrates the encoder signals after adjustment.

In order to ensure accurate control of d.c. motor 1 and thus of the drive components connected therewith, such as a print wheel or a type face carriage, it is necessary that the sinusoidal signals generated at the output channels of light receivers 7, 8 do not go above or below a certain maximum value. For this purpose, it is necessary that only certain quantities of light beams from light source 6 impinge on the entrance surfaces of the light receivers. The adjustment of the level voltage to a predetermined maximum value is effected, according to the invention, in that the cross section of the bundle of light beams coming from light source 6 can be changed by means of shutters 18, 19 that can be manually pivoted into and adjusted in their beam paths and aligned so that the maximum values of the output voltages in light receivers 7, 8 are adjusted in the simplest manner to a predetermined voltage. Since two light receivers 7, 8 are illuminated by the same light source 6, two shutters 18, 19 are provided with which the cross sections of the light beams impinging on light receivers 7, 8 can be varied individually. The exit surface 20 of light source 6, which is a photodiode, has a circular configuration. The two shutters 18, 19 each have a semicircular covering face 21, 22 and are arranged diametrally to the exit surface 20 of light source 6 so that the outermost circumferential faces 23, 24 of the two covering faces 21, 22 just do not touch one another in the center of exit surface 20 where the light beams exit from light source 6 if the light beams are covered as much as possible. The semicircular covering faces 21, 22 are disposed at the free ends of pivot arms 25, 26 whose other ends are fastened at a right angle to the frontal faces of set screws 27, 28. Set screws 27, 28 are arrestable in a friction lock in clamp bearings 29, only one of which is shown in FIG. 1, and can be adjusted by means of a tool that is customary in the trade. The free end faces of set screws 27, 28 are provided with enlarged heads 30 which are equipped with slots 31 for normal screw drivers. Adjustment of the level voltages of light receivers 7, 8 can thus be effected by simply pivoting shutters 21, 22 by means of a normal screw driver so that the voltages A, B which are shown in FIG. 4 as not yet being adjusted, can be brought to the desired voltages A′, B′ shown in FIG. 5.

Figure 3:
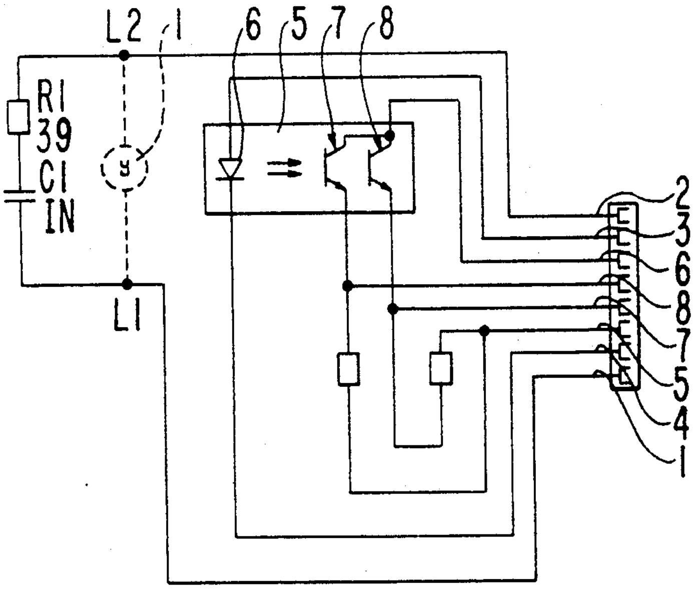
FIG. 3 is a circuit schematic showing details of FIG. 2.

FIG. 3 depicts a circuit schematic for controlling d.c. motor 1. In this case, light source 6 is a photodiode and the two light receivers 7, 8 are phototransistors.

We claim:

1. A scanner device for a clock disc including light transmitting slits which are uniformly distributed over the circumference of the clock disc for transmitting signals to an evaluation circuit to control the position of a driven member operated by a d.c. motor, wherein the clock disc is fixed to a drive shaft of the motor and the slits are scannable by means of a light barrier arrangement in the form of a position sensor including light source means for projecting a bundle of light beams along respective beam paths and light receiving means disposed for receiving the light beams after having passed through the slits and producing output voltages representing the received light beams, the improvement wherein said light source means comprises a sole light source which has an exit surface with a circular cross section, and further comprising two adjustable shutters, each having an identical semicircular covering face and arranged diametrically with respect to the circular cross section of the exit surface of said sole light source, said shutters being mounted for being manually pivoted into the beam paths for changing the cross section of the bundle of light beams coming from said sole light source so that the maximum values of the output voltages of said light receiving means are adjusted to predetermined voltages, wherein the covering faces of said shutters each have circumferential faces which, when said shutters are in a position of maximum coverage of the light beams, just do not touch one another in the center of the exit surface where the light beams exit from said sole light source.

2. A device according to claim 1, wherein said light receiving means comprises two light receivers which are illuminated by said sole light source and the cross sections of the light beams impinging on said light receivers are separately changeable by a manual pivotable movement of a respectively associated one of said shutters.

3. A device according to claim 1, and further comprising: pivot arms each having a free end connected to a respective one of said semicircular covering faces are disposed at the free ends of pivot arms and another end; set screws, each being engageable by a conventional tool for adjustment and each having a frontal face fastened at a right angle to a respective one of the other ends of said pivot arms; and clamp bearing means for mounting said set screws by way of a friction lock for arresting a set position of each of said set screws.

4. A device according to claim 3, wherein said set screws each have an enlarged head attached to said free frontal face and provided with a slot for engagement with a screw driver.

5. A device according to claim 1, wherein said sole light source comprises a photodiode and said light receiving means comprises phototransistors.

* * * * *